United States Patent
Guillermin et al.

(10) Patent No.: US 6,896,587 B2
(45) Date of Patent: *May 24, 2005

(54) PROCESS FOR GRINDING AN OPHTHALMIC LENS, INCLUDING A PLOTTING OPERATION WITHOUT CONTACT

(75) Inventors: Laurent Guillermin, Paris (FR); Sylvaine Millet, Soisy Sous Montmorency (FR)

(73) Assignee: Essilor International (Compagnie Generale D'Optique), Charenton le Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/412,320

(22) Filed: Apr. 14, 2003

(65) Prior Publication Data

US 2003/0224701 A1 Dec. 4, 2003

(30) Foreign Application Priority Data

Apr. 12, 2002 (FR) .............................. 0204623

(51) Int. Cl.[7] .............................................. B24B 49/00
(52) U.S. Cl. .................................. 451/8; 451/43; 451/5
(58) Field of Search ............................. 451/5, 6, 8, 42, 451/43, 44, 240, 255, 256; 73/104, 105

(56) References Cited

U.S. PATENT DOCUMENTS

| | | | | | |
|---|---|---|---|---|---|
| 4,596,091 | A | * | 6/1986 | Daboudet et al. | 451/240 |
| 5,588,899 | A | * | 12/1996 | Gottschald | 451/5 |
| 5,727,987 | A | * | 3/1998 | Gottschlad | 451/5 |
| 6,122,063 | A | | 9/2000 | Berndt et al. | |
| 6,427,094 | B1 | * | 7/2002 | Mizuno | 700/159 |
| 6,564,111 | B1 | * | 5/2003 | Gottschald | 700/95 |
| 2002/0041357 | A1 | | 4/2002 | Farcy et al. | |
| 2003/0220054 | A1 | * | 11/2003 | Guillermin et al. | 451/43 |
| 2004/0039546 | A1 | * | 2/2004 | Guillermin et al. | 702/155 |

* cited by examiner

Primary Examiner—Dung Van Nguyen
(74) Attorney, Agent, or Firm—Young & Thompson

(57) ABSTRACT

Process for grinding the rim of an ophthalmic lens that has two opposite faces, following a predetermined contour corresponding to that of a ring of a spectacle frame in which the lens is intended to be mounted, the contour being delimited on each of the faces by an edge, and the process includes a plotting stage in which the three-dimensional shape of at least one of the edges is plotted. In the plotting stage, the edge is scanned on the illuminated face of lens using a light beam forming a light spot on the face, the successive positions of an image of the light spot are plotted simultaneously on optical reception elements pointing towards the light spot, and the three-dimensional shape of the edge is deduced from the plots made, machining of the lens being carried out according to the plot or plots.

48 Claims, 6 Drawing Sheets

PROCESS FOR GRINDING AN OPHTHALMIC LENS, INCLUDING A PLOTTING OPERATION WITHOUT CONTACT

BACKGROUND OF THE INVENTION

The invention relates to the grinding of ophthalmic lenses.

It relates more particularly to a process for grinding the rim of an ophthalmic lens following a predetermined contour corresponding to that of the ring of a spectacle frame in which the glass is intended to be fitted, wherein the profile of at least one of the faces of the lens at right angles to said predetermined contour to be formed is plotted, then the rim of the rotating lens is brought into contact with a grinding tool.

DESCRIPTION OF THE RELATED ART

Before beginning the grinding of the lens, it is often desirable to know the profile of at least one of its faces at right angles to the contour to be formed, so that during grinding it is possible to control the relative position of the lens with respect to the grinding tool so that the working part of the latter is always perpendicular to the rim of the lens, and in particular is perpendicular to a predetermined zone on the rim of the lens.

Generally, the contour to be formed is known—and stored in memory—beforehand using a plot carried out directly on the ring of the frame.

Processes of the aforementioned type are already known, in which the plotting operation is carried out using a mechanical sensor that is brought into contact with the rotating lens, at right angles to the contour to be formed.

An elastic return device holds the sensor in contact with the lens for at least one complete revolution of the latter.

As the face of the lens with which the sensor is in contact seldom has symmetry of revolution, during rotation of the lens there is a translation of the sensor, from which, knowing at any moment the angular position of the lens about its rotational axis, it is possible to deduce the three-dimensional shape of the profile being plotted.

For a deeper understanding of this process, reference may be made to the French patent application filed by the applicant and published under the number FR-A-2 543 039.

This process, and the machine for its implementation, have been entirely satisfactory up to now.

However, if we take into account the increasingly demanding requirements of spectacle wearers and, consequently, of the opticians who of course wish to satisfy these requirements, it must be admitted that this process, and therefore this machine, have a certain number of drawbacks, which are enumerated below.

The mechanical force applied by the sensor to the lens engenders stresses and strains in the latter which can lead to measurement errors during plotting of the profile.

The friction engendered by the sliding of the sensor on the lens during its rotation can produce unattractive scratches on the relevant face of the latter.

This same friction causes chronic wear on the sensor, which, on the one hand, leads to measurement errors during plotting and, on the other hand, necessitates a frequent replacement of the sensor.

Taking account of the radius of curvature of the relevant face of the lens and hence of the inclination of said face relative to the translation axis of the sensor, the reaction of the lens applied to the sensor contains a component perpendicular to said axis, which can lead to a bending, or at least a misalignment of the sensor and, thus, induce not only a measurement error, but also damage to the sensor.

When the profile to be plotted is, at least locally, next to the rim of the rough lens, use of the sensor is risky as it tends to slide towards the outside of the lens, where it is bound to be damaged as the latter rotates.

The aggressive machining environment, where water and grinding splinters mix, causes accelerated wear on the sensor which, moreover, is a mechanical assembly whose manufacture is difficult and expensive.

To preserve the sensor, it is regular practice to lower the rotational speed of the lens during profile plotting, which increases the cycle time and thus impairs productivity.

The invention aims to resolve in particular the aforementioned disadvantages, by providing a process and a grinding machine permitting profile plotting that is at the same time safe, reliable, accurate and durable.

To this end, the invention proposes a process for grinding the rim of an ophthalmic lens that has opposite faces called front face and rear face, following a predetermined contour corresponding to that of a ring of the spectacle frame in which the lens is intended to be mounted, said contour being delimited at the front face by a so-called front edge and at the back by a so-called rear edge, said process comprising a plotting stage in which the three-dimensional shape of at least one of the front or rear edges is plotted; in the plotting stage, said edge is scanned over the illuminated face of the lens using a light beam forming a light spot on said face, and at the same time, the successive positions of an image of said light spot are plotted on optical reception means that point towards said light spot, and the three-dimensional shape of said edge is deduced from the plots carried out; a machining stage is also envisaged, in which the rim of the rotating lens is brought into contact with a grinding tool, and the relative positioning of the lens and of the tool is controlled according to said plot or plots.

According to a second aspect, the invention proposes a machine for the grinding of the rim of an ophthalmic lens that has opposite, front and rear faces, following a predetermined contour corresponding to that of the ring of a spectacle frame in which the lens is intended to be mounted, said contour to be formed being delimited at the front by a "front edge" and at the back by a "rear edge", and the machine has a rotating support for holding the lens, a rotary grinding tool, means for moving the support and the tool with respect to one another in a direction parallel to the rotational axis of the support, means for moving the support and the tool with respect to one another in a direction perpendicular to the axis of the support, a control unit that is capable of controlling said means of displacement, and in addition the machine has at least one optical measuring device comprising a light source producing a light beam directed towards one of the faces of the lens so as to form a light spot there, optical reception means pointed towards said light spot and connected to said control unit, the latter including means of calculation suitable for calculating the three-dimensional shape of at least one of the edges with respect to the plots produced on the optical reception means.

As the plots are produced without contact, the lens does not suffer any stress or strain. Surface scratches are avoided. The relative positioning of the lens and of the profile of the device allowing the plots to be produced is invariable, to the benefit of the accuracy of the measurements.

It is possible to reduce the cycle time, i.e. to increase the rotational speed of the lens during the plotting stage, without affecting the accuracy of the measurements, hence an increased productivity.

If necessary, in the plotting stage, both the three-dimensional shape of the front edge and that of the rear edge are plotted, by scanning each edge, using two light beams forming a light spot respectively on each of the faces, and the successive positions of an image of each light spot are plotted simultaneously on optical reception means that point towards each light spot, then the three-dimensional shape of the front edge and that of the rear edge are deduced from the plots carried out.

To this end, the machine has two optical measuring devices having, on the one hand, two light sources opposite either side of the lens, these sources producing two light beams directed respectively towards the front and towards the back of the lens to form a light spot on each of them and, on the other hand, optical reception means pointing towards each light spot, said means of calculation being set up for calculating the three-dimensional shape of each edge.

In the plotting stage, a so-called intermediate profile, situated between the front and rear edges, can be located on the contour to be formed, for example in order to produce, on the rim of the lens, a bevel perpendicular to said intermediate profile. The means of calculation are then set up for making such a selection.

To this end, in the machining stage, the grinding tool used is a bevelling wheel, and the relative position of the lens and of the tool is controlled so as to make a bevel on the lens contour to be formed, with the peak of this bevel coincident with said intermediate profile.

In the plotting stage, each light source is activated for example, i.e. each light beam produced, alternately for each angular position of the lens. Interferences between the light sources are thus avoided. The control unit is then set up for activating the light sources alternately.

The or both light sources and, consequently, the or both light beams, are preferably separated from the rotational axis of the lens.

According to a first embodiment, the or both light beams are rectilinear, so that they form an approximately point-sized light spot on the illuminated face of the lens. The light source is set up for producing such a light beam.

The light source is, preferably, oriented in such a way that the light beam is approximately parallel to the rotational axis of the lens.

In the plotting stage, the successive coordinates of the light spot parallel to the rotational axis of the lens are then deduced from the plotting of each of the successive positions of the image of the light spot.

According to a second embodiment, said light beam is flat, so that it forms a linear light spot on the illuminated face of the lens. The light source is, of course, set up for producing such a beam.

Preferably, the or both light sources are oriented in such a way that the light beam they produce has a bisector that is approximately parallel to the rotational axis of the lens.

In the plotting stage, an image point of the point of intersection of the light spot and of the edge is then selected in the image of the light spot on the optical reception means, the successive positions of this point are plotted on the optical reception means, and the successive coordinates of this point of intersection parallel to the rotational axis of the lens are deduced from the plot of each of the successive positions of this point.

The successive coordinates of the light spot can be deduced using a calculation by triangulation, based on the plot of the positions of its image.

According to one embodiment, the or both light sources are oriented in such a way that the light beam and the rotational axis of the lens are approximately coplanar.

For example, the optical reception means are set up so that its optical sight axis forms a constant sight angle, which is not zero, with the light beam.

The value of the sight angle is preferably between 40° and 50°, for example it can be chosen to be equal to 45°.

As the light beam is rectilinear and forms a plane with the rotational axis of the lens, the sight axis forms for example with the light beam, a plane that is perpendicular to the plane formed by the light beam and the rotational axis of the lens.

When the light beam is flat and extends in a plane containing the rotational axis of the lens, the optical reception means are, preferably, set up so that the sight axis forms, with the bisector of the light beam, a plane that is perpendicular to the plane containing the light beam and the rotational axis of the lens.

For purposes of accuracy, the or both light sources can be chosen in such a way that the light beam that they produce is coherent; for example, in the case of a laser.

The optical reception means comprise for example an objective lens whose optical axis is coincident with the sight axis as well as a screen that is intersected by the sight axis and on which the image of said light spot is formed.

This screen can be approximately perpendicular to said sight axis, but it can also be inclined with respect to the latter at an angle that is not a right-angle.

For example, the screen is inclined with respect to the sight axis at an angle whose value is approximately equal to 45°.

BRIEF DESCRIPTION OF THE DRAWINGS

Other characteristics and advantages of the invention will emerge from the following description of one embodiment given by way of non-limitative example, this description referring to the attached drawings in which.

DESCRIPTION OF THE PREFERRED EMBODIMENTS

Figure 1:
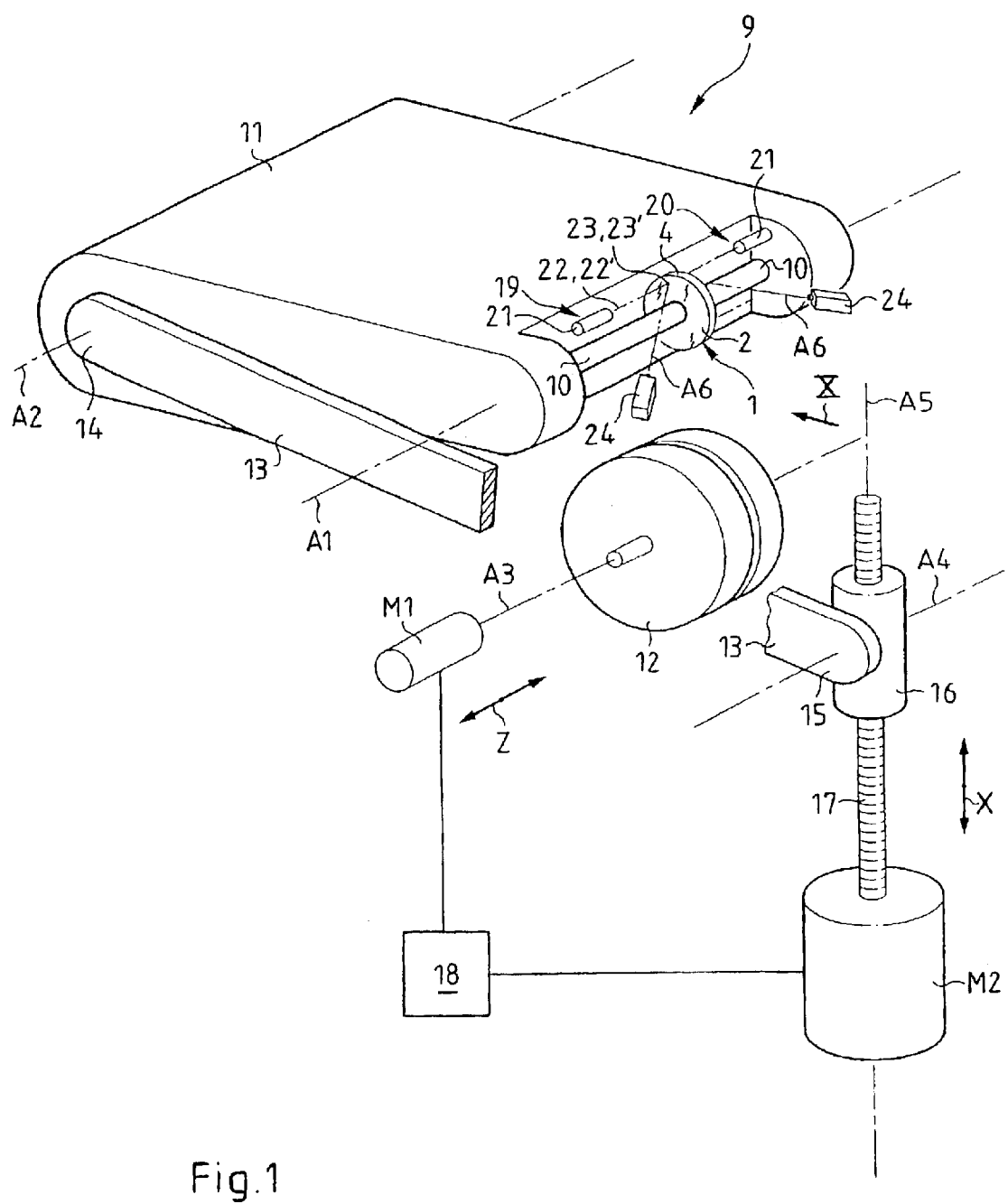
FIG. 1 is a partial perspective view of a grinding machine according to the invention, which comprises a rotating support for holding the lens, a rotary grinding tool, two measuring devices each formed from a light source and an optical reception device, arranged on either side of the lens.

The figures show a lens 1 that has two optical surfaces constituted respectively by a so-called front face 2 and a so-called rear face 3 connected by a rim 4 that is initially cylindrical and of circular profile (FIGS. 1, 2), which generally corresponds to the form in which the rough lenses are delivered to the optician.

The lens 1 is to undergo operations of grinding which, by machining its rim 4, aim to adapt the contour of the latter to the contour of the ring of a spectacle frame (not shown).

Finally, the rim 4 of the lens 1, delimited at the front face 2 by a so-called front edge 5 and at the rear face 3 by a so-called rear edge 6 (shown by dashed lines in FIG. 2), will have a contour that coincides approximately with that of the ring of the frame.

In order to ensure that the lens 1 is held firmly, the ring usually has an internal groove, commonly called a bezel, generally of triangular cross-section, and a rib 7 of triangular cross-section, commonly called a bevel, will be made on the rim 4 of the lens 1, to fit with said bezel.

Some bezels have a curved cross-section, for example a circular arc, in which case a rib with a corresponding curved cross-section will be made on the lens 1.

On the other hand, some rings of the frame have an internal rib and/or a wire, in which case a groove will be made in the rim 4 of lens 1 to fit with said rib and/or wire.

In the remainder of the description, it will be assumed that it is desired to make a bevel 7 on the lens 1, but the corresponding grinding operations can easily be adapted for making a groove.

Thus, grinding of the lens 1 comprises at least two operations, namely a trueing operation, with the aim of giving the rim 4 of the lens 1 a contour close to that of the ring of the frame, generally with allowance, then a finishing operation, aiming if necessary to form a bevel on the rim 4 of the lens 1.

In order to permit easy fitting of the lens 1 in the corresponding ring of the frame, the three-dimensional shape of the bevel 7 will have to coincide with the three-dimensional shape of the bezel, which does not generally extend in a plane but has a certain curvature.

This three-dimensional shape of the bezel is plotted prior to the operations of grinding of the lens 1, using special apparatus (not shown).

The three-dimensional shape of the bevel 7, i.e., in practice, the three-dimensional shape of its peak, is therefore predetermined.

This plotting operation is generally followed by an operation of orientation and centring of the lens 1 so that it is in the correct angular position with respect to the ring of the frame, while ensuring its optical centre coincides with the axis of the wearer's pupil in the horizontal wearing position.

Figure 2:
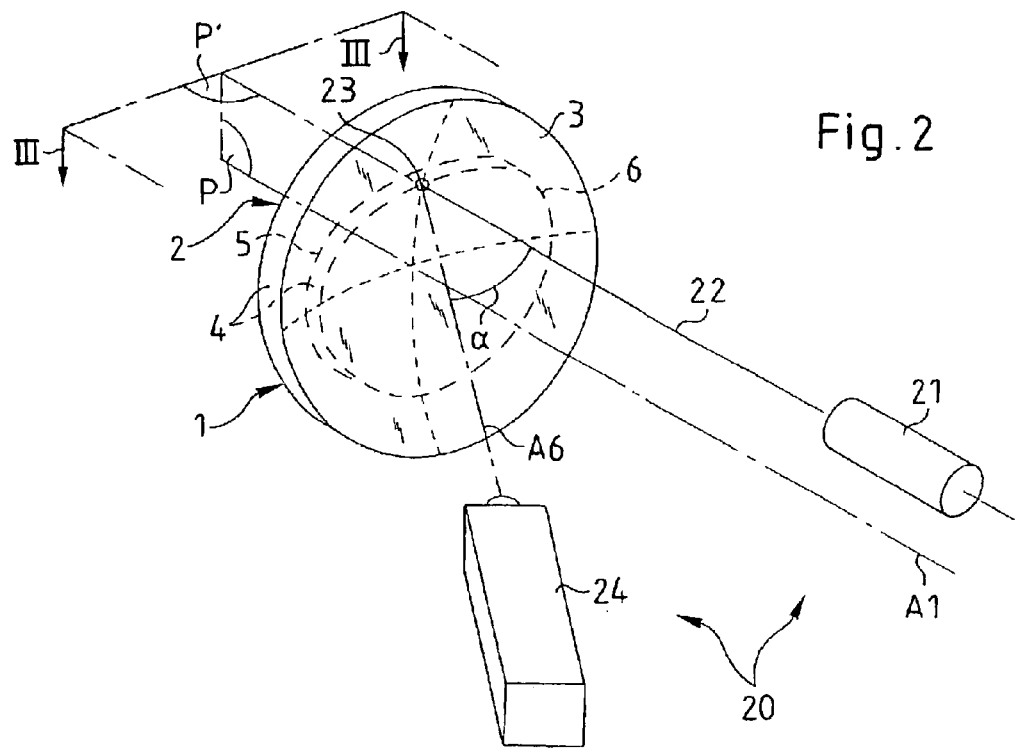
FIG. 2 is a detailed perspective view of the lens and of one of the measuring devices of FIG. 1, according to a first embodiment in which the light source produces a linear light beam forming, on the illuminated face of the lens, an approximately point-sized light spot; the profile to be plotted is also shown there, with dashed lines.

Once this positioning operation has been carried out, an adhesive gripping block 8, commonly called "gland or holding means" is placed on lens 1, and the whole is then mounted in a grinding machine 9 (described later) while maintaining the centring and orientation of the lens 1. The latter is then configured as shown in FIG. 1.

These operations are described in more detail in the French patent application filed by the applicant and published under number FR-A-2 742 238. Moreover, the corresponding equipment, manufactured by the applicant, is available commercially.

Furthermore, the lens 1 has, at its rim, a certain thickness, so that after mounting in the ring of the frame it projects on either side of the latter.

The bevel 7 to be made must therefore be positioned correctly between the front edge 5 and the rear edge 6 in order to ensure correct positioning of lens 1 in its ring.

In order to ensure this correct positioning of bevel 7, the three-dimensional shape of the front edge 5 and of the rear edge 6 to be formed is plotted prior to the grinding of lens 1.

As will be seen later, each of these plots is carried out without contact.

For the moment, however, we shall describe the grinding machine 9. It is an automatic grinding machine, for example digitally-controlled.

Said grinding machine 9 has two support shafts 10 opposite each other, between which the lens 1 is gripped. These support shafts 10 are rotated together about a first common axis A1.

The support shafts 10 are mounted on a mobile support 11 mounted freely pivoting on a frame (not shown) of the grinding machine 9, about a second axis A2 parallel to the first axis A1. Taking account of these kinematics, the support 11 is called rocker in the remainder of the description.

The grinding machine 9 also has a tool 12 located at right angles to the support shafts 10 and rotated about a third axis A3 parallel to the other two axes A1, A2. This comprises a set of grinding wheels suitable for carrying out all of the operations of trueing, finishing, bevelling or grooving. However, it could equally well be a single grinding wheel.

The tool 12 is carried by a carriage (not shown) that can move in translation, using a motor M1, following axis A3. This possibility of translational movement is shown in FIG. 1 by the double arrow referenced Z.

The motion of the rocker 11 moves the support shafts 10 towards or away from tool 12, so as to impart the predetermined shape to the contour of lens 1.

The grinding machine 9 moreover contains a bar 13 with articulated mounting, on the one hand, by a first extremity 14, to the machine frame about the second axis A2 of the rocker 11 and, on the other hand, by a second extremity 15 about a fourth axis A4 parallel to the previously-mentioned axes A1, A2, A3, to a collar 16 mobile in translation along a fifth axis A5, commonly called restitution axis, perpendicular to the first axes A1 to A4. The possibility of translational movement of collar 16 is shown in FIG. 1 by the double arrow referenced X.

The collar 16 is internally threaded; it is held by screwing on a threaded rod 17 extended along the fifth axis A5 about which it is rotated, using a motor M2.

A contact sensor (not shown), for example of the electromagnetic, optical or, more simply, electrical type, is interposed between the rocker 11 and the bar 13.

Said grinding machine 9, to which this invention applies, is well known to a person skilled in the art as it is very widespread in the trade and has been made the subject, by the Applicant, of numerous patents.

Reference may be made in particular to the French patent application published under the number FR-A-2 734 505.

When the lens 1 to be ground, gripped between the support shafts 10 and rotated by them, is brought into contact with the tool 12 by pivoting of rocker 11 towards a working position in which the support shafts 10 are close to the tool 12, the lens 1 is subjected to removal of material by the tool 12 until the rocker 11 comes up against bar 13.

Each grinding operation (trueing, finishing) is deemed completed when resting of the rocker 11 against the bar 13 has been detected, via the sensor, on a complete turn of the lens 1 about the first axis A1. The contour of the rim 4 of the lens 1 then corresponds, generally with allowance, to the contour of the ring of the frame for which lens 1 is intended.

The grinding machine 9 has a control unit 18 for coordinating these operations, connected for this purpose to motors M1 and M2. The three-dimensional shape of the bezel is stored in the memory of this control unit 18.

The grinding machine 9 also has, for plotting the three-dimensional shape of the front edge 5 to be formed, a first optical measuring device 19, and for plotting the three-dimensional shape of the rear edge 6 to be formed, a second optical measuring device 20.

These devices 19, 20 are arranged on either side of the lens 1, each containing a light source 21, fixed to the frame of the grinding machine 9 and arranged opposite one of the faces 2, 3 of lens 1

This light source 21, which is arranged, with respect to tool 12, on the other side of support shaft 10, produces a light beam 22 directed towards this face 2, 3 of the lens 1 in order to form a light spot 23 there.

Formation of this spot 23 results from a diffusion phenomenon upon impact of the beam 22 on the face 2, 3 which in fact presents a certain roughness.

Figure 3:
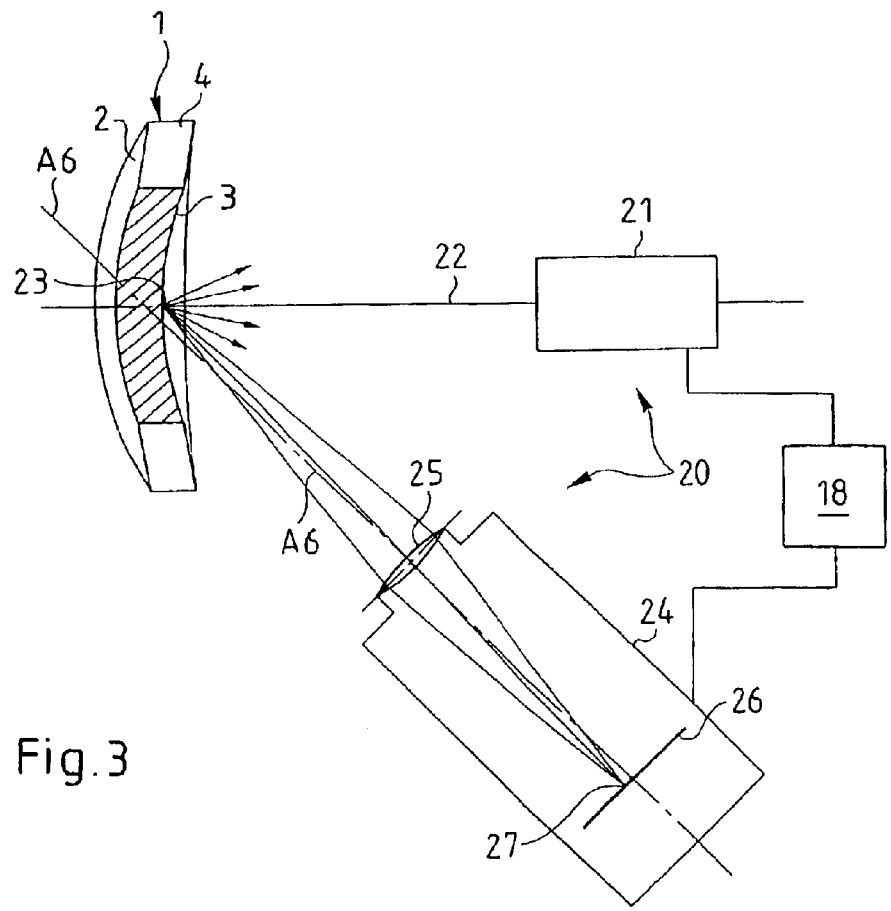
FIG. 3 is a partially sectioned side view of the lens and of the measuring device of FIG. 2, through a section plane produced on that diagram by plane III—III.

This diffusion phenomenon is illustrated in FIG. 3 by concentric arrows, which represent the diffused light.

This light source 21 is preferably a laser, chosen for its accuracy, the light beam 22 produced then being coherent.

According to a first embodiment, shown in FIGS. 2 to 6, the source is chosen or controlled so that the light beam 22 produced is rectilinear, so that the spot 23 formed on the illuminated face 2, 3 of the lens 1 is an approximately point-sized spot.

The light source 21 is arranged in order that the beam 22 is at one and the same time separated from the rotational axis A1 of the support shafts 10 and parallel to it, so that they jointly form a plane designated P.

Each optical measurement device 19, 20 also contains optical reception means 24, in the form of a camera fitted with an objective lens 25 and a photosensitive screen 26.

Figure 6:
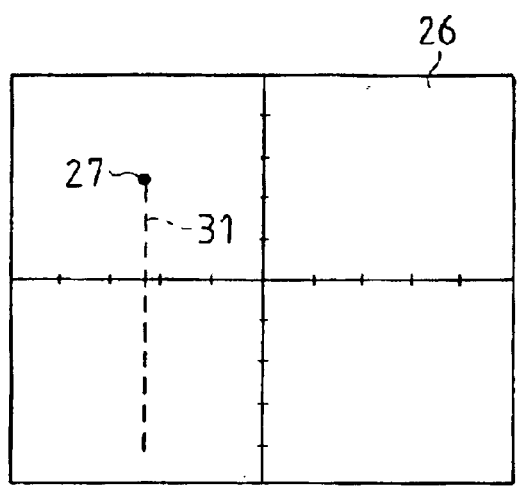
FIG. 6 is a schematic view showing the screen of the optical reception device of the preceding figures, where there is, in the form of a point, an image of the light spot formed on the illuminated face of the lens.

The camera 24 is pointed towards the light spot 23. More precisely, this camera 24 has a sight axis A6, coincident with the optical axis of its objective lens 25, which cuts the light beam 22 in the vicinity of the light spot 23, in such a way that an approximately point-sized image 27 of it is formed on the screen 26 (FIG. 6).

The camera 24 is oriented, on the one hand, in order that its sight axis A6 forms, together with the light beam 22 a plane, designated P', perpendicular to the plane P.

It is oriented on the other hand in order that its sight axis A6 forms with the light beam 22 an angle, called sight angle $\alpha$, constant, which is not zero.

The value of this sight angle $\alpha$ is for example between 40° and 50°. Preferably, the value of the sight angle $\alpha$ is approximately equal to 45°.

The following procedure is adopted for plotting the three-dimensional shape of each edge 5, 6 to be formed.

The lens 1 is positioned by a pivoting of the rocker 11 until the light spot 23 is coincident with the edge 5, 6 to be formed, the projection of which onto a plane perpendicular to the rotational axis A1 of the lens 1 is already known, this projection having been stored in the control unit 18 during the plotting of the contour of the bezel.

The lens 1 is then rotated about its axis A1, the control unit 18 simultaneously and continuously controlling the pivoting of the rocker 11 in order that the light spot 23 scans the whole of the edge 5, 6 to be formed, coinciding with it at each moment.

Moreover, taking account of the curvature of the illuminated face 2, 3, the light spot 23 moves, during the rotation of the lens 1, parallel to the rotational axis A1 of the latter, following a rectilinear path between two limiting return points 29, 30, the distance separating these two points 29, 30 being called depth of field.

Conjointly, the point image 27 of the light spot 23 moves on the screen 26 and it too follows a rectilinear path 31 shown by dashed lines in FIG. 6. This path 31 is the projection onto the screen 26 of the path followed by the light spot 23.

Of course, the size of the screen 26 and the distance from the lens 1 at which the camera 24 is situated are chosen according to the depth of field in order that the image 31 of the path of light spot 23 never leaves the screen 26.

Generally, the depth of field is known in advance, so that it is possible to preset the screen 26.

A displacement of the light spot 23 over a distance dz along its rectilinear path 28 causes a proportional displacement of its image 27, along its own path 31, over a distance dl.

The successive positions of the image 27 of spot 23 on the screen 26 are plotted at every moment.

Known solutions allow such a plot to be produced. Thus, the screen 26 can be constituted by a CCD-type matrix optical sensor, the images which form there then being the subject of a standard digital processing.

Here, the wavelength of the emitted beam 22 and the range of the wavelengths that can be transmitted by the material of the lens 1 are chosen so as to be incompatible.

The material of the lens 1 allows certain UV rays to pass and more generally any beam of a minimum wavelength of 325 nm. A light source the wavelength of which is less than this value will behave, vis-à-vis any lens, as if the latter was opaque. A UV diode or a UV laser diode can, to this end, be advantageously employed as light source so as to be able to suppress any secondary images of the beam 22 forming on the optical reception means, these images also forming from the image reflected directly by the first encountered surface of the lens 1, which is necessary for implementing the invention.

These secondary images may result from the fact that, when the emitted beam 22 is transmissible by the lens 1, the whole intensity of the beam 22 is not entirely reflected by the first surface encountered. A residual beam can be diffused in the inside of the glass, at an angle of refraction, encounter the face opposite to the incident face and then be reflected as a secondary image in the direction of the optical reception means 24. Other secondary images can also be formed by the multiple reflections of the beam between the faces of the glass, along paths confined to the thickness of the lens 1.

Figure 4:
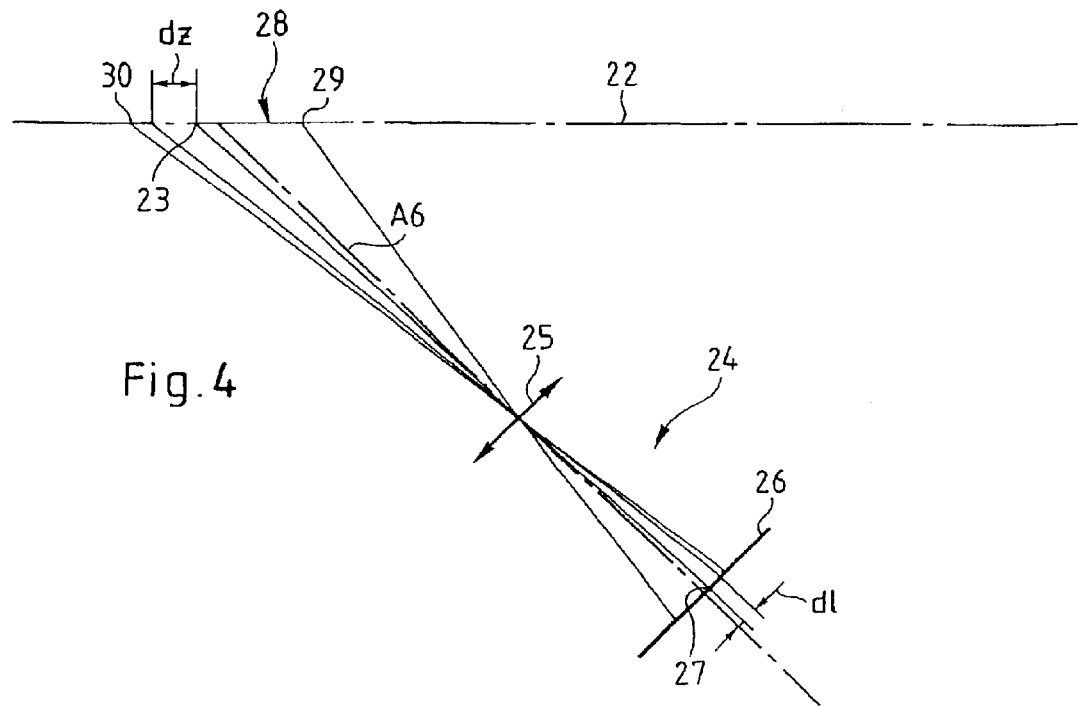
FIG. 4 is a schematic showing, in plan, the illumination axis of the light source of FIGS. 2 and 3 as well as the objective lens of the optical reception device and its screen, according to an embodiment in which the screen is perpendicular to the optical axis of the objective lens.
Figure 5:
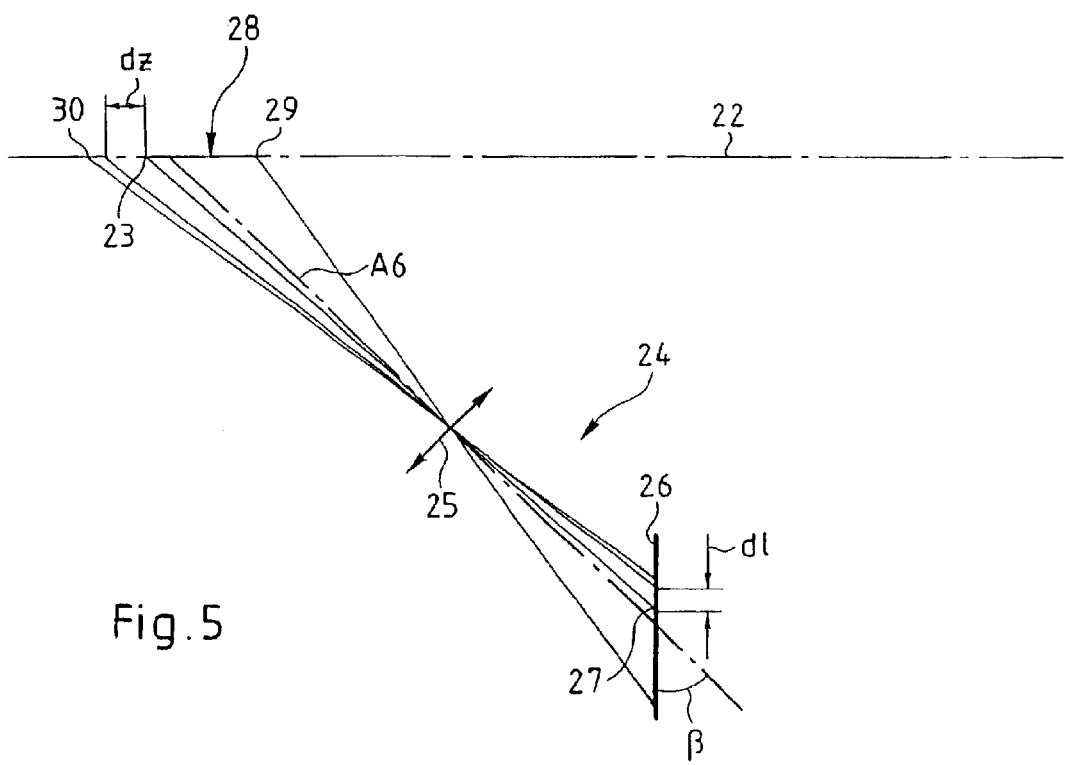
FIG. 5 is a view analogous to FIG. 4, according to a variant of embodiment in which the screen of the optical reception device forms an angle of about 45° with the optical axis of the objective lens.

According to an embodiment illustrated in FIGS. 3 and 4, the screen 26 extends in a plane perpendicular to the sight axis A6.

In a variant (FIG. 5), the screen 26 extends in a plane inclined with respect to the sight axis, forming with the latter an angle β that is not a right-angle, whose value is between 40° and 50°, and is preferably equal or approximately equal to 45°.

A simple calculation by triangulation allows the position or coordinate of the spot 23 along its path 28 to be deduced from the position of its image 27.

The results are stored, for each angular position of the lens 1, in the control unit 18, in such a way that following a complete revolution of the lens 1, there is stored in the control unit 18 a set of data forming a digital modelling of the three-dimensional shape of the edge 5, 6 to be formed.

Figure 7:
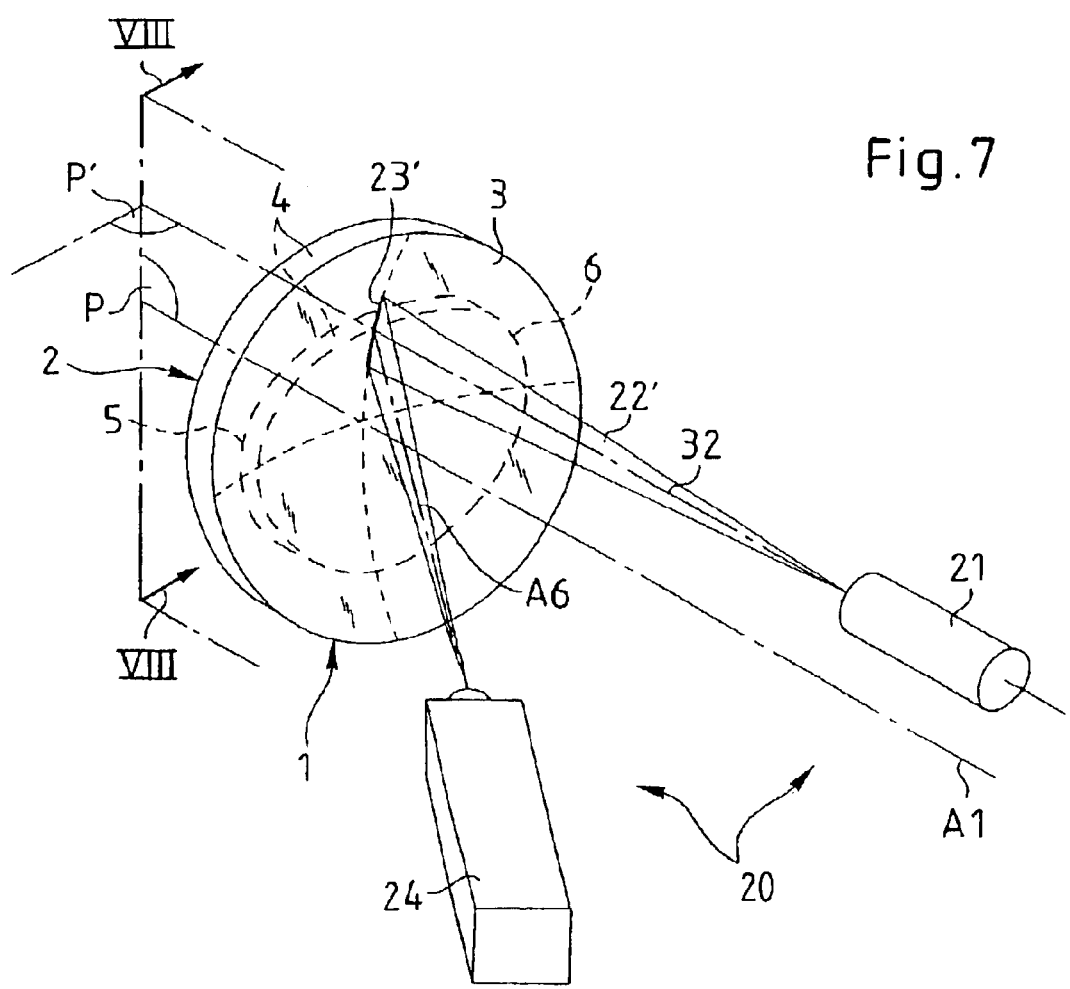
FIG. 7 is a view analogous to FIG. 2, according to a second embodiment in which the light source produces a flat light beam forming a linear light spot on the illuminated face of the lens.
Figure 8:
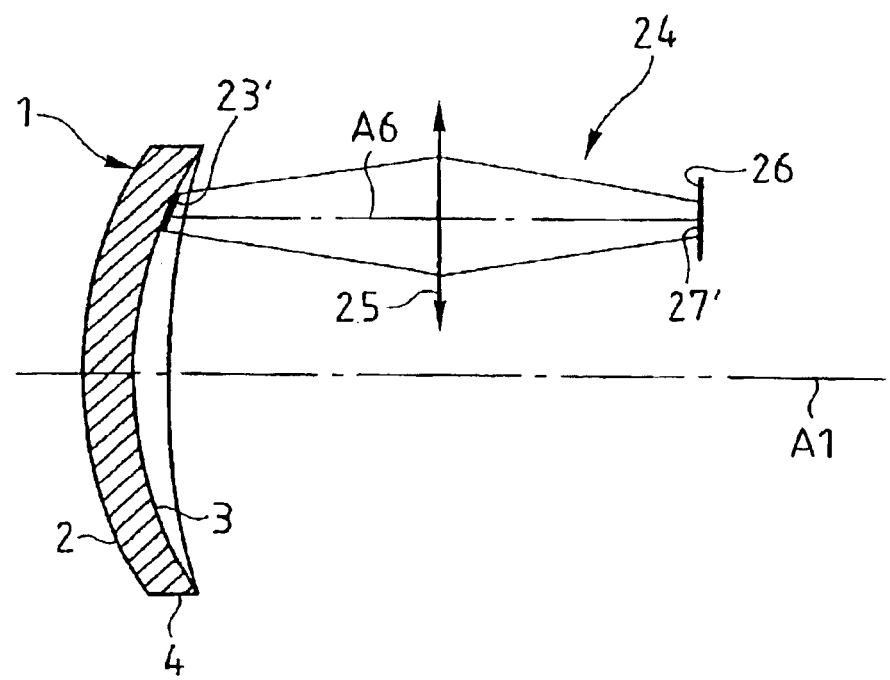
FIG. 8 is a sectional view of the lens of FIG. 7, through the section plane VIII—VIII; the optical measuring device is also shown, schematically.
Figure 9:
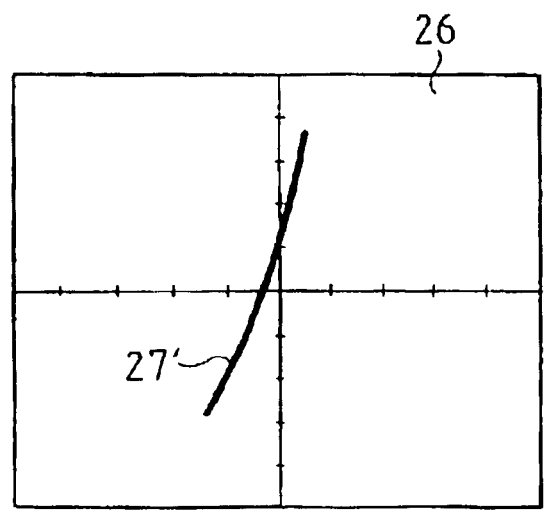
FIG. 9 is a schematic view analogous to FIG. 6, but for the second embodiment of FIGS. 7 and 8: accordingly the image of the light spot appears in the form of a line on the screen.
Figure 10:
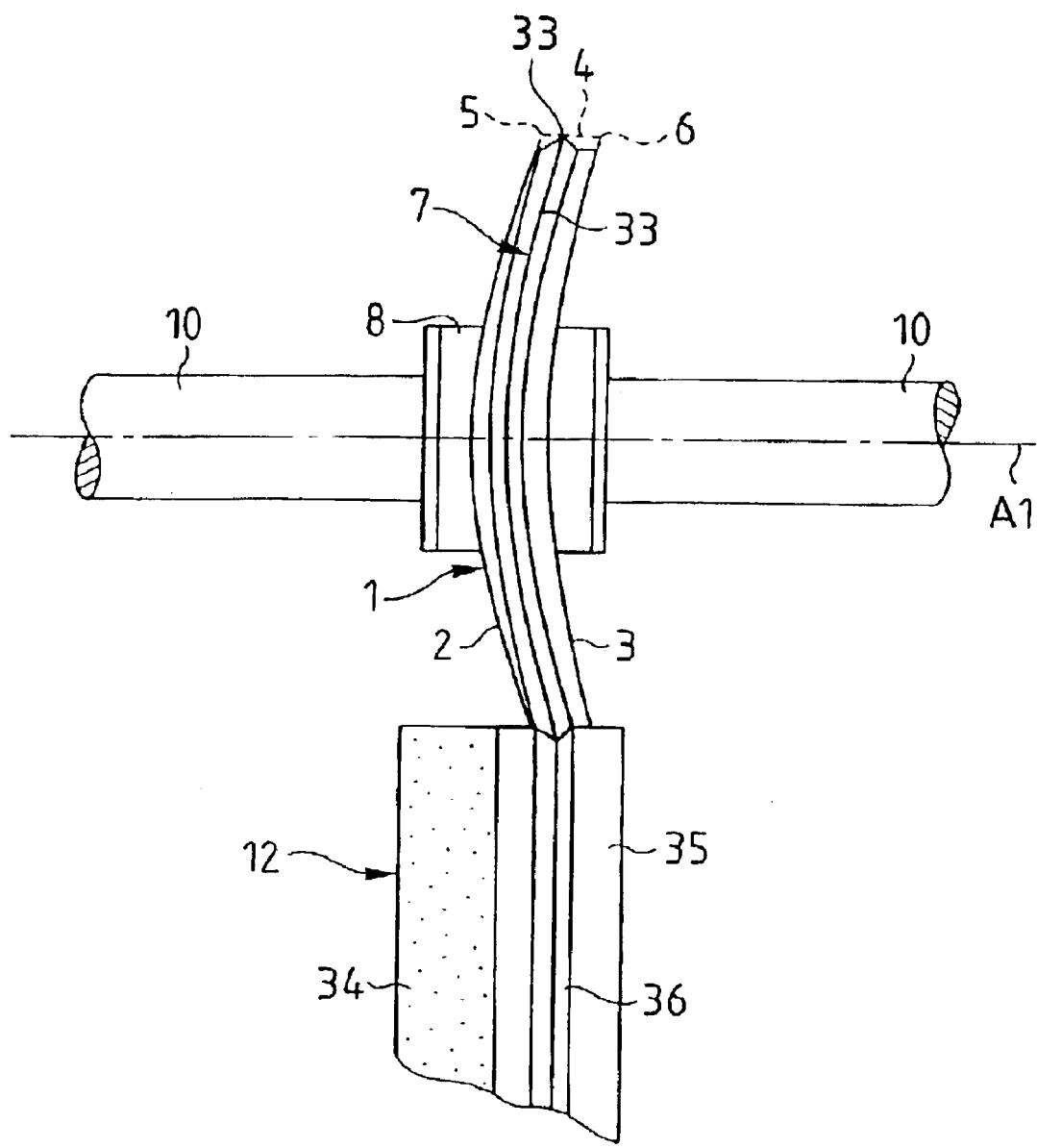
FIG. 10 is a detailed side view showing the lens of FIG. 1 during bevelling, along the direction indicated by the arrow X in this figure.

According to a second embodiment, shown in FIGS. 7 to 9, the source 21 is chosen or controlled so that the light beam 22' produced is flat, so that the spot 23' formed on the illuminated face 2, 3 of the lens 1 is an approximately linear spot.

Mounting of the optical measuring device 19, 20 is the same as that previously described for the first embodiment, use of the bisector 32 of light beam 22' replacing, for the orientation of camera 24, the rectilinear the light beam 22 of the first embodiment.

Thus, since the light source 21 is separated from the rotational axis A1 of the support shafts 10, it is arranged and controlled in such a way that, on the one hand, the plane P in which the light beam 22' extends contains this rotational axis A1 and, on the other hand, in such a way that the bisector 32 of beam 22' is approximately parallel to the same rotational axis A1.

The sight axis A6 forms, with the bisector 32 of light beam 22', a plane P' perpendicular to the plane P formed by the latter, the value of the sight angle α being the same as before.

In practice, in order to obtain such an arrangement, it is sufficient to repeat the set-up of the first embodiment described above, and attach a spreading lens to the light source 21 to form a flat light beam 22'.

Thus, the camera 24 is oriented so that its sight axis A6 cuts the light beam 22' on its bisector 32, the image 27' of the light spot 23' on screen 26 then being a curve, owing to the concavity (or to the convexity) of the illuminated face 2, 3.

To plot the three-dimensional shape of the edge 5, 6 to be formed, for the mechanical part the same procedure as described for the first embodiment is followed, only the processing of the image 27' is different. The means of calculation of the control unit 18 are adapted accordingly.

Thus, the lens 1 is positioned by pivoting the rocker 11 until the bisector 32 of the light beam 22' coincides with the edge 5, 6 to be formed, of the illuminated face 2, 3, the latter thus being approximately centred on the light spot 23'.

The lens 1 is rotated about its axis A1, with the control unit 18 controlling, simultaneously and continuously, the pivoting of the rocker 11 so that the light spot 23' scans the whole of the edge 5, 6 to be formed, the bisector 32 of the light beam 22' being coincident at every moment with the edge 5, 6 to be formed.

During rotation of the lens 1, the light spot 23' moves in parallel with the rotational axis A1 of the latter following a path between two limiting return lines, while its image 27' moves simultaneously on the screen 26.

The position of each point of this image 27' on screen 26 is plotted at every moment.

A simple averaging calculation permits the selection of an intermediate point of image 27', which corresponds to the intersection of the spot 23' with the edge 5, 6 to be formed, from which the position or coordinate along its path, i.e. parallel to the rotational axis A1 of lens 1, is deduced by triangulation.

Processing of the data is then the same as before, and finally a digital modelling of the three-dimensional shape of the edge 5, 6 to be formed is available.

On the other hand, this second process is, at least in theory, more accurate than the first.

In fact, when there are the impurities on the path of the rectilinear light beam 22, the image 27 that forms on screen 26 no longer corresponds to a point of the edge 5, 6 to be formed, which can lead to a plotting error, though this error is limited.

When using a flat light beam 22', the presence of impurities on the path of beam 22' causes the appearance of discontinuities in the image 27', but it is possible to reconstruct a continuous image by a simple interpolation calculation.

According to an embodiment illustrated in FIG. 1, the optical measurement devices 22, 22' are arranged symmetrically with respect to the lens 1, in such a way that their light sources 21 are situated one opposite the other, the beams 22, 22' that they produce being respectively coaxial (for the first embodiment) or coplanar (for the second embodiment).

In order to obtain a plot of the front edge 5 and of the rear edge 6, at least two different procedures are possible.

It is possible to carry out a first complete revolution of the lens 1, during which one of the sources 21 is activated in order to plot the three-dimensional shape of the corresponding edge 5 to be formed, then a second complete revolution during which the other light source 21 is activated in order to plot the other edge 6 to be formed.

As a variant, it is possible to carry out a single complete revolution of the lens 1, during which, for each angular position of the latter, each of the two light sources 21 is activated alternately in order to produce the plots simultaneously on the two edges 5, 6 to be formed without the light source 21 of the first measurement device 19 disturbing, by a refraction phenomenon, the plots produced by the second device 20, and vice versa.

In concrete terms, these alternating activations manifest themselves in flashes in phase opposition of the two light sources 21.

Finally a digital modelling of the three-dimensional shape of the front edge 5 and of the rear edge 6 to be formed is available, as well as of their location parallel to the rotational axis A1 of lens 1.

It is therefore known in advance the thickness of lens 1 at right angles to the edges 5, 6 to be formed, and the location can therefore be chosen, between the front edge 5 and the rear edge 6, of a so-called intermediate, predetermined profile 33 corresponding to the peak of the bevel 7 to be formed.

As was explained previously, grinding of lens 1 comprises a first trueing operation, during which lens 1 is machined, its rim 4 being subjected to removal of material until it has the desired, predetermined contour, the aforementioned front edge 5 and rear edge 6 thus being formed.

This trueing stage can be carried out using a trueing wheel 34 of the set of grinding wheels 12.

Grinding then includes a second finishing stage, and bevelling is applicable, during which a bevel 7 is machined on the rim 4 of the lens 1 following the predetermined shape and location as described above.

This stage can be carried out using a finishing wheel 35 of the set of grinding wheels 12, adjacent to the trueing wheel 34, and in which there is a groove 36 that is V-shaped in cross-section.

For each angular position of lens 1, the control unit 18 controls, with respect to the plots carried out, the relative positioning of the tool 12 and of the lens 1 in a direction parallel to the rotational axis A1 of lens 1, so that the bottom of the groove 36 is always at right angles to the intermediate profile 33 stored in the control unit 18.

The optical measurements described above are more accurate than the conventional mechanical measurements, to the benefit of the accuracy of grinding.

The invention has been described for the production of a V-shaped bevel 7 on the rim 4 of the lens 1. However, it is obvious that it is possible to make a groove instead of a bevel in an identical manner.

This merely requires the use of a grooving wheel with a peripheral rib.

Similarly, the invention can be employed for chamfering the edges of the lens, with respect to the three-dimensional plots carried out.

When it is only necessary to chamfer one of the edges of the rim of the lens, it may be sufficient to plot the three-dimensional shape of this edge alone, in the manner described previously. It is then sufficient to employ or activate just one of the optical measuring devices.

What is claimed is:

1. Process for grinding the rim (4) of an ophthalmic lens (1) having a front face (2) and a rear face (3) opposite one another, following a predetermined contour corresponding to that of the ring of a spectacle frame in which the lens (1) is intended to be mounted, said contour being delimited on the front face (2) by a front edge (5) and on the rear face (3) by a rear edge (6), with the process comprising a plotting stage in which the three-dimensional shape of at least one of the front (5) or rear (6) edges is plotted, characterized in that, in the plotting stage, said edge (5, 6) is scanned on the illuminated face (2, 3) of the lens (1) using a light beam (22, 22') forming a light spot (23, 23') on said face (2, 3), the successive positions of an image (27, 27') of said light spot (23, 23') are plotted simultaneously, on optical reception means (24) pointing towards said light spot (23, 23'), and the three-dimensional shape of said edge (5, 6) is deduced from the plots carried out, and in that it comprises in addition a machining stage according to which the lens (1), while it is rotated, is brought into contact by its rim (4) with a grinding tool (12), and the relative positions of the lens (1) and the tool (12) are controlled according to the plot or plots.

2. Process according to claim 1, characterized in that, in the plotting stage, the three-dimensional shape of the front edge (5) and that of the rear edge (6) are plotted, each edge (5, 6) is scanned using two light beams (22, 22') forming a light spot (23, 23') respectively on each of the faces (2, 3), the successive positions of an image (27, 27') of each light spot (23, 23') are plotted simultaneously, on optical reception means (24) pointing towards each light spot (23, 23'), and the three-dimensional shape of the front edge (5) and that of the rear edge (6) are deduced from the plots made.

3. Process according to claim 2, characterized in that, in the plotting stage, a so-called intermediate profile (33) between the front edge (5) and the rear edge (6) is located on the contour to be formed.

4. Process according to claim 3, characterized in that, in the machining stage, a bevelling grinding wheel (35) is employed, and the relative positions of lens (1) and tool (12) are controlled so that a bevel (7), the peak of which is coincident with said intermediate profile (33), is made on the contour to be formed of the lens (1).

5. Process according to claim 2, characterized in that in the plotting stage, each light beam (22, 22') is activated alternately for each angular position of the lens (1).

6. Process according to claim 1, characterized in that the or both light beams (22, 22') are separated from the rotational axis (A1) of the lens (1).

7. Process according to claim 6, characterized in that the or both light beams (22) are rectilinear, so that it forms an approximately point-sized light spot (23) on the illuminated face (2, 3) of the lens (1).

8. Process according to claim 7, characterized in that said light beam (22) is approximately parallel to the rotational axis (A1) of the lens (1).

9. Process according to claim 7, characterized in that, in the plotting stage, the successive coordinates of the light spot (23) parallel to the rotational axis (A1) of lens (1) are deduced from the plot of each of the successive positions of the image (27) of the light spot (23).

10. Process according to claim 6, characterized in that said light beam (22') is flat, so that it forms a linear light spot (23') on the illuminated face (2, 3) of the lens (1).

11. Process according to claim 10, characterized in that said light beam (22') presents a bisector (32) approximately parallel to the rotational axis (A1) of the lens (1).

12. Process according to claim 10, characterized in that, in the plotting stage, an image point of the point of intersection of the light spot (23') and of the edge (5, 6) is selected in the image (27') of the light spot (23') on the optical reception means (24), the successive positions of this point are plotted on the optical reception means (24), and the successive coordinates of said point of intersection parallel to the rotational axis (A1) of the lens (1) are deduced from the plot of each of the successive positions of this point.

13. Process according to claim 9, characterized in that said deduction is carried out using a calculation by triangulation.

14. Process according to claim 1, characterized in that the light beam (22, 22') and the rotational axis (A1) of the lens (1) are approximately coplanar.

15. Process according to claim 1, characterized in that the optical reception means (24) have an optical sight axis (A5) forming with the light beam (22, 22'), a constant sight angle (α), which is not zero.

16. Process according to claim 15, characterized in that the value of the sight angle (α) is between 40° and 50°.

17. Process according to claim 16, characterized in that the value of the sight angle (α) is approximately equal to 45°.

18. Process according to claim 15, characterized in that, as the light beam (22) is rectilinear and forms a plane (P) with the rotational axis (A1) of the lens (1), the sight axis (A6) forms, with the light beam (22), a plane (P') perpendicular to the plane (P) formed by the light beam (22) and the rotational axis (A1) of the lens (1).

19. Process according to claim 15, characterized in that, as the light beam (22') is flat and extends in a plane (P) containing the rotational axis (A1) of the lens (1), the sight axis (A6) forms, with the bisector (32) of the light beam (22'), a plane (P') perpendicular to the plane (P) containing the light beam (22') and the rotational axis (A1) of the lens (1).

20. Process according to claim 1, characterized in that said light beam (22, 22') is coherent.

21. Process according to claim 20, characterized in that said light beam (22, 22') is a laser.

22. Process according to claim 1, characterized in that the wavelength of the light beam (22, 22') has a value that is outside of the range of wavelengths transmissible by the ophthalmic lens (1).

23. Process according to claim 1, characterized in that the wavelength of the light beam (22, 22') has a value below 325 nm.

24. Process according to claim 22, characterized in that the light beam (22, 22') originates from a UV diode.

25. Machine for grinding the rim (4) of an ophthalmic lens (1) having a so-called front face (2) and a so-called rear face (3) opposite one another, following a predetermined contour corresponding to that of the ring of a spectacle frame in which the lens (1) is intended to be mounted, this contour to be formed being delimited on the front face (2) by a front edge (5) and on the rear face (3) by a rear edge (6), the machine (9) comprising a rotating support (10) for mounting the lens (1), a rotary grinding tool (12), means (M1) for moving the support (10) and the tool (12) with respect to each other in a direction parallel to the rotational axis (A1) of support (10), means for moving support (10) and the tool (12) with respect to each other in a direction perpendicular to the axis (A1) of support (10), a control unit (18) suitable for controlling said means of displacement (M1, M2), characterized in that it includes at least one optical measurement device (19, 20) containing a light source (21) producing a light beam (22, 22') directed towards one of the faces (2, 3) of the lens (1) in order to form there a light spot (23, 23'), optical reception means (24) pointed towards said light spot (23, 23') and connected to said control unit (18), the latter including means of calculation suitable for calculating the three-dimensional shape of at least one of the edges (5, 6) according to the plots produced on the optical reception means (24).

26. Machine according to claim 25, characterized in that it includes two optical measurement devices (19, 20) containing two opposite-facing light sources (21) arranged on either side of the lens (1), these sources producing two light beams (22, 22') directed respectively towards the front face (2) and towards the rear face (3) of the lens (1) in order to form a linear light spot (23, 23'), on each of them, optical reception means (24) pointed towards each light spot (23, 23'), said means of calculation being set up to calculate the three-dimensional shape of each edge (5, 6).

27. Machine according to claim 26, characterized in that the means of calculation are set up for locating, on the contour to be formed, an intermediate profile (33) between the front edge (5) and the rear edge (6).

28. Machine according to claim 27, characterized in that the grinding tool (12) has a bevelling grinding wheel (35).

29. Machine according to claim 26, characterized in that the control unit (18) is set up to activate the light sources (21) alternately.

30. Machine according to claim 25, characterized in that the or both light sources (21) are separated from the rotational axis (A1) of the support (10).

31. Machine according to claim 30, characterized in that the or both light sources (21) are set up for producing a rectilinear light beam (22).

32. Machine according to claim 31, characterized in that the or both light sources (21) are oriented so that the light beam (22) that it produces is approximately parallel to the rotational axis (A1) of the support (10).

33. Machine according to claim 30, characterized in that the or both light sources (21) are set up for producing a flat light beam (22').

34. Machine according to claim 33, characterized in that the or both light sources (21) are set up so that the bisector (32) of the light beam (22') is approximately parallel to the rotational axis (A1) of the support (10).

35. Machine according to claim 25, characterized in that the or both light sources (21) are set up in order that the light beam (22, 22') that it produces and the rotational axis (A1) of the support (10') are approximately coplanar.

36. Machine according to claim 25, characterized in that the optical reception means (24) are set up in order that their sight axis (A6) forms with the light beam (22, 22') a constant sight angle ($\alpha$), which is not zero.

37. Machine according to claim 36, characterized in that the optical reception means (24) are set up in order that the value of the sight angle ($\alpha$) is between 40° and 50°.

38. Machine according to claim 37, characterized in that the optical reception means (24) are set up in order that the value of the sight angle ($\alpha$) is approximately equal to 45°.

39. Machine according to claim 36, characterized in that the optical reception means (24) are set up so that their sight axis (A6) is situated in a plane (P') containing the axis of the light beam and perpendicular to the plane (P) formed by the light beam (22, 22') and the rotational axis (A1) of support (10).

40. Machine according to claim 25, characterized in that the optical reception means (24) include an objective lens (25) the optical axis of which is coincident with the sight axis (A6) as well as a screen (26) that is cut by the sight axis (A6) and on which the image (27, 27') of said light spot (23, 23') forms.

41. Machine according to claim 40, characterized in that the said screen (26) is approximately perpendicular to said sight axis (A6).

42. Machine according to claim 40, characterized in that the said screen (26) is inclined relative to the said sight axis (A6), by an angle ($\beta$) that is not a right-angle.

43. Machine according to claim 42, characterized in that the said screen is inclined relative to the sight axis (A6) by an angle ($\beta$) whose value is approximately equal to 45°.

44. Machine according to claim 25, characterized in that the said light source (21) is set up to produce a coherent light beam (22, 22').

45. Machine according to claim 43, characterized in that the said light source (21) is a laser.

46. Machine according to claim 25, characterized in that the wavelength of the light beam (22, 22') has a value situated outside the range of the wavelengths that can be transmitted by the ophthalmic lens (1).

47. Machine according to claim 25, characterized in that the wavelength of the light beam (22, 22') has a value of less than 325 nm.

48. Machine according to claim 46, characterized in that the light source (22, 22') is a UV diode.

* * * * *